3,312,710
METHOD OF PRODUCING AROMATIC NITRILES IN THE VAPOR PHASE IN THE PRESENCE OF MANGANESE PARATUNGSTATE AS A CATALYST
Shigeru Sakuyama, Nishinomiya, Kenzo Oda, Osaka, Takashi Ohara, Akashi-shi and Noboru Shimizu and Toshiaki Nakamura, Osaka, Japan, assignors to Nippon Shokubai Kagaku Kogyo Co., Ltd., Osaka, Japan, a corporation of Japan
No Drawing. Filed July 11, 1966, Ser. No. 564,008
Claims priority, application Japan, Sept. 4, 1962, 37/37,357; Apr. 6, 1963, 38/17,297
2 Claims. (Cl. 260—294.9)

This application is a continuation-in-part of application Ser. No. 303,675, filed Aug. 21, 1963, now abandoned.

This invention relates to a method of preparing aromatic nitriles, more particularly the present invention relates to a method of preparing aromatic nitriles in high yield by reacting alkyl-substituted aromatic compounds specifically, methyl-substituted benzenes or methyl-substituted pyridines, ammonia and molecular oxygen at elevated temperatures in the vapor phase in the presence of a catalyst comprising manganese paratungstate.

In the prior art, various types of catalysts have been previously proposed for preparing aromatic nitriles by reacting alkyl-substituted aromatic compounds with ammonia and molecular oxygen at elevated temperatures in the vapor phase. The most generally used and/or suggested catalysts of the prior art are the vanadium pentoxide catalyst and the metal phosphate catalyst. However, their use suffers many disadvantages and shortcomings. Thus, when a vanadium pentoxide catalyst is used for preparing phthalonitrile from orthoxylene, the yield is low or practically nil while an imide is formed as the principal product. Furthermore, when a metal phosphate catalyst is used, its activity is too low to be economically desirable.

It is therefore an object of the present invention, in consideration of the shortcomings of the conventional prior art methods, as discussed above, to provide a method of preparing aromatic nitriles in high yield from methyl-substituted benzenes or methyl-substituted pyridines.

Another object of the present invention is to provide a catalyst having high activity and high selectivity whereby aromatic nitriles will be obtained in high yield.

The objects of the present invention are specifically accomplished by subjecting the above-mentioned methyl-substituted aromatic compounds to reaction with ammonia and molecular oxygen in a high temperature gaseous phase in the presence of manganese paratungstate as the catalyst. In addition, the advantages of the present invention may also be attained by making a promoter co-exist with the manganese paratungstate catalyst.

As a promoter, at least one compound selected from the group consisting of (a) oxides of aluminum, magnesium, cobalt, chromium, nickel, zinc, molybdenum and tin, for instance, aluminum oxide and magneisum oxide,
(b) paratungstates of aluminum, magneisum, cobalt, chromium, nickel, zinc, molybdenum and tin, for instance, nickel paratungstate, zinc paratungstate and tin paratungstate, and
(c) aluminum-, magnesium-, cobalt-, chromium-, nickel-, zinc-, molybdenum- and tin-salts of aluminic-, chromic-, molybdic- and stannic-acids, for instance, magnesium aluminate, cobalt aluminate, magnesium chromate, cobalt chromate, zinc chromate, tin chromate, cobalt molybdate, magnesium stannate, cobalt stannate and zinc stannate, is used. It is preferable to use at least one of these promoters in an amount of 0–1 part by weight based on 3 parts by weight of said manganese paratungstate.

The catalyst whose active component is manganese paratungstate employed in the present invention can be prepared for example, by mixing an aqueous solution of paratungstate such as ammonium paratungstate with an aqueous solution of manganese salt such as manganese nitrate and calcining the precipitate of

$3MnO \cdot 7WO_3 \cdot 11H_2O$ produced. A mixture of the catalyst and the promoter also can be prepared by, for example, mixing precipitate of a metal hydroxide such as aluminum hydroxide, precipitate of a metal paratungstate such as nickel paratungstate and/or precipitate of a metal metalate such as cobalt chromate with said precipitate of

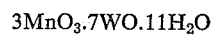
$3MnO_3 \cdot 7WO \cdot 11H_2O$ and calcining th emixture. Furthermore, by mixing an aqueous solution of a water-soluble salt such as magnesium nitrate with a precipitate of $3MnO \cdot 7WO_3 \cdot 11H_2O$, evaporating the mixture to dryness and then calcining the same, the objective mixture of the catalyst and the promoter can also be obtained. The most simple technique is to mix a commercially available active alumina with manganese paratungstate.

Calcination is carried out at a temperature and for a period of time sufficient to evaporate the crystal water and to decompose impurities such as metallic acid, ammonium metalate and others contained in the precipitate, however, normally it is carried out at 300–1000° C. for 1–15 hours. Because in the present invention the step of preparing nitrile is carried out at 350–600° C., it is possible to carry out said desired calcination in this step.

The present invention is particularly effective in preparing benzonitrile from toluene, phthalonitrile and orthotolunitrile from orthoxylene, isophthalonitrile and metatolunitrile from metaxylene, terephthalonitrile and paratolunitrile from paraxylene, 1,2,4-tricyanobenzene from pseudocumene, 1,3,5 - tricyanobenzene from mesytilene, 1,2,4,5 - tetracyanobenzene from durene, and cyanopyridines from the methyl-substituted pyridines, e.g., alpha-picoline, and 2,5-lutidine.

Moreover, orthoxylene is used as the starting material, the fact that phthalonitrile is obtained as the principal product with a formation of only a trace, or at most, a few percent of imide, is one of the outstanding features of the present invention not obvious from the conventional prior art processes.

The reaction is carried out by bringing into contact a mixed gas comprising an alkyl-substituted aromatic compound specifically, ammonia and molecular oxygen with the catalyst as mentioned hereinbefore. If necessary, an inert gas such as nitrogen, carbon dioxide, steam, etc., can be mixed in the foregoing mixed gas as diluents. For obtaining optimum results, the molar ratio of ammonia to the alkyl-substituted aromatic compound in the reaction mixture should be at least one, preferably 3 to 10 times the stoichiometric ratio (where ammonia is in excess). The reaction may be carried out over a wide temperature range, for example, between 350 and 600° C., preferably between 400 and 550° C. The contact time may likewise vary but it has been found that the contact times of between 0.5 and 20 seconds are most suitable. Although the reaction is advantageously carried out at atmospheric pressure, it is also possible to accomplish the reaction under either elevated pressures, or reduced pressures.

The form in which the catalyst or the mixture of catalyst and promoter is used is optional; it is possible to use it in a powdered form or in a pelleted form. Furthermore, if necessary, it may be supported by a suitable carrier such as diatomaceous earth, silica, alumina, etc. Thus, the catalyst of this invention can be applied either to a fluidized or a fixed bed process.

For a clear understanding of the present invention, the following specific examples are given. These examples are intended to be merely illustrative of the invention and not in limitation thereof.

EXAMPLE I 133.6 grams of ammonium paratungstate $$3(NH_4)_2O.7WO_3.6H_2O$$

were dissolved in 1.7 liters of hot water at about 80° C. with stirring, to which solution a solution obtained by dissolving 61.0 grams of manganese nitrate $$Mn(NO_3)_2.6H_2O$$

in about 200 cubic centimeters of water was added, dropwise. The produced manganese paratungstate $$3MnO.7WO_3.11H_2O$$

was filtered, washed with water, thereafter shaped, and calcined at 540° C. for 4 hours.

50 cubic centimeters of the catalyst so obtained were charged in a stainless steel U-shaped reaction pipe having a diameter of 25 mm.; said pipe was immersed in a salt bath, and a reaction was carried out at a reaction temperature of 460° C. for a contact time of 6 seconds by passing thereinto a mixed gas consisting of 2.0% by volume of toluene, 6.0% by volume of ammonia, and 92.0% by volume of air.

As a result, the yield of benzonitrile was 86.7% based on the toluene supplied.

EXAMPLE II

In a method of Example I, a reaction was carried out at a reaction temperature of 470° C. for a contact time of 3 seconds by passing thereinto a mixed gas consisting of 1.15% by volume or orthoxylene, 8.63% by volume of ammonia, and 90.22% by volume of air.

As a result, the yield of phthalonitrile, orthotolunitrile and phthalimide were 63%, 0–0.1% and 5.7%, respectively, based on the orthoxylene supplied.

EXAMPLE III

In a method of Example I, a reaction was carried out at a reaction temperature of 470° C. for a contact time of 6 seconds by passing thereinto a mixed gas consisting of 1.15% by volume of metaxylene, 8.63% of ammonia and 90.22% by volume of air.

As a result, the yields of isophthalonitrile and metatolunitrile were 85.3% and 11.5%, respectively, based on the metaxylene supplied.

EXAMPLE IV

In a method of Example I, a reaction was carried out at a reaction temperature of 462° C. for a contact time of 6 seconds by passing thereinto a mixed gas consisting of 1.15% by volume of paraxylene, 8.63% by volume of ammonia, and 90.22% by volume of air.

As a result, the yields of terephthalonitrile and paratolunitrile were 83.6% and 7.1%, respectively, based on the paraxylene supplied.

EXAMPLE V

In the method of Example I, a reaction was carried out at a reaction temperature of 430° C. for a contact time of 2.5 seconds, by passing thereinto a mixed gas consisting of 1.0% by volume of alpha-picoline, 8.0% by volume of ammonia and 92.0% by volume of air.

As a result, the yield of alpha-cyanopyridine was 59.9% based on the alpha-picoline supplied.

EXAMPLE VI

The precipitate of manganese paratungstate $$3MnO.7WO_3.11H_2O$$

obtained by the method of Example I was mixed with 14.5 grams of diatomaceous earth. The mixture was shaped and calcined at 540° C. for 4 hours.

Using 50 cubic centimeters of the catalyst so obtained, in the method of Example I, a reaction was carried out at a reaction temperature of 460° C. for a contact time of 2.4 seconds by passing thereinto a mixed gas consisting of 0.6% by volume of paraxylene, 6.0% by volume of ammonia and 93.4% by volume of air.

As a result, the yields of terephthalonitrile and paratolunitrile were 81.6% and 15.8%, respectively, based on the paraxylene supplied.

EXAMPLE VII

To the precipitate of manganese paratungstate $$3MnO.7WO_3.11H_2O$$

obtained by the method of Example I, a solution obtained by dissolving 57.2 grams of magnesium nitrate $$Mg(NO_3)_2.6H_2O$$

in about 50 cubic centimeters of water was added. After evaporating the water, the mixture was shaped and calcined at 540° C. for 4 hours.

Using 50 cubic centimeters of the catalyst so obtained in the method of Example I, a reaction was carried out at a reaction temperature of 460° C. for a contact time of 2.4 seconds by passing thereinto a mixed gas consisting of 0.8% by volume of metaxylene, 8.0% by volume of ammonia, and 91.2% by volume of air.

As a result, the yields of isophthalonitrile and metatolunitrile were 73.2% and 15.6%, respectively, based on the metaxylene supplied.

EXAMPLE VIII

To the precipitate of manganese paratungstate $$3MnO.7WO_3.11H_2O$$

obtained by the method of Example I, a solution obtained by dissolving 75.0 grams of aluminum nitrate $$Al(NO_3)_3.9H_2O$$

in about 50 cubic centimeters of water was added. After evaporating the water, the mixture was shaped and calcined at 540° C. for 4 hours.

Using 50 cubic centimeters of the catalyst so obtained, a reaction was carried out under the conditions same as those in Example I.

As a result, the yield of benzonitrile was 78.2% based on the toluene supplied.

EXAMPLE IX 15.2 grams of cobalt acetate $Co(CH_3COO)_2.4H_2O$ were dissolved in about 300 cubic centimeters of water at 85° C., to which solution a solution obtained by dissolving 11.9 grams of potassium chromate $K_2CrO_4$ in about 50 cubic centimeters of water was added, dropwise. The produced precipitate of cobalt chromate $CoCrO_4.2H_2O$ was mixed with the precipitate of manganese paratungstate $3MnO.7WO_3.11H_2O$, the resultant mixture was shaped, and thereafter calcined at 540° C. for 4 hours.

Using 50 cubic centimeters of the catalyst so obtained, in the method of Example I, a reaction was carried out at a reaction temperature of 445° C. for a contact time of 1.8 seconds by passing thereinto a mixed gas consisting of 0.6% by volume of orthoxylene, 4.8% by volume of ammonia, and 94.6% by volume of air.

As a result, the yields of phthalonitrile, orthonitrile, and phthalimide were 84.5%, 4.7%, and 5.2%, respectively, based on the orthoxylene supplied.

EXAMPLE X

In Example I, using paraxylene instead of orthoxylene, a reaction was carried out.

As a result, the yields of terephthalonitrile and paratolunitrile were 91.8% and 2.3%, respectively, based on the paraxylene supplied.

EXAMPLE XI 23.0 grams of ammonium paratungstate $$3(NH_4)_2O.7WO_3.6H_2O$$

were dissolved in about 300 cubic centimeters of hot water at 85° C., to which solution a solution obtained by dissolving 10.6 grams of nickel nitrate $$Ni(NO_3)_2.6H_2O$$

in about 50 cubic centimeters of water, was added dropwise. The produced precipitate of nickel paratungstate $3NiO.7WO_3.14H_2O$ was mixed with the precipitate of manganese paratungstate obtained by the method of Example I, and the resultant mixture was shaped and calcined at 540° C. for 4 hours.

Using 50 cubic centimeters of the catalyst so obtained, in the method of Example I, a reaction was carried out at a reaction temperature of 445° C. for a contact time of 2.4 seconds by passing thereinto a mixed gas consisting of 0.8% by volume of paraxylene, 6.4% by volume of ammonia, and 92.8% by volume of air.

As a result, the yields of terephthalonitrile and paratolunitrile were 77.2% and 14.6% respectively, based on the paraxylene supplied.

EXAMPLE XII 23.8 grams paratungstate $3(NH_4)_2O.7WO_3.6H_2O$ were dissolved in about 300 cubic centimeters of hot water at 85° C. to which solution a solution obtained by dissolving 7.5 grams of zinc nitrate $Zn(NO_3)_2.6H_2O$ in about 30 cubic centimeters of water was added, dropwise. The produced precipitate of zinc ammonium paratungstate $(NH_4)_2O.2ZnO.7WO_3.13H_2O$ was mixed with the precipitate of manganese paratungstate $3MnO.7WO_3.11H_2O$ obtained by the method of Example I. The resultant mixture was shaped and calcined at 540° C. for 4 hours.

Using 50 cubic centimeters of the catalyst so obtained, in the method of Example I, a reaction was carried out at a reaction temperature of 460° C. for a contact time of 1.8 seconds by passing thereinto a mixed gas consisting of 0.6% by volume of metaxylene, 4.8% by volume of ammonia, and 94.6% by volume of air.

As a result, the yields of isophthalonitrile and metatolunitrile were 82.6% and 11.3%, respectively, based on the metaxylene supplied.

EXAMPLE XIII

The precipitate of manganese paratungstate $$3MnO.7WO_3.11H_2O$$

was mixed with 13.0 grams of molybdic acid $$H_2MoO_4.H_2O$$

and the resultant mixture was shaped and calcined at 540° C. for 4 hours.

Using 50 cubic centimeters of the catalyst so obtained, a reaction was carried out under conditions same as those of Example I.

As a result, the yield of benzonitrile was 65.8%.

EXAMPLE XIV 26.3 grams of ammonium paratungstate $$3(NH_4)_2O.7WO_3.6H_2O$$

were dissolved in about 400 cubic centimeters of hot water at 85° C., to which solution a solution obtained by dissolving 24.8 grams of chloro-ammonium stannate $(NH_4)_2[SnCl_6]$ in about 50 cubic centimeters of water was added dropwise.

The produced precipitate of tin paratungstate $$9SnO_2.13WO_3.nH_2O$$

was mixed with the precipitate of manganese paratungstate $3MnO.7WO_3.11H_2O$ obtained by the method of Example I. The resultant mixture was washed with water until the chlorine ion disappeared, shaped, and calcined at 540° C. for 4 hours.

Using 50 cubic centimeters of the catalyst so obtained, in the method of Example I, a reaction was carried out at a reaction temperature of 420° C. for a contact time of 1.8 seconds by passing thereinto a mixed gas consisting of 0.5% by volume of orthoxylene, 5.0% by volume of ammonia, and 94.5% by volume of air.

As a result, the yields of phthalonitrile, orthonitrile and phthalimide were 49.8%, 13.8% and 5.2%, respectively, based on the orthoxylene supplied.

EXAMPLE XV

To a mixture of cobalt chromate $CoCrO_4.2H_2O$ and manganese paratungstate $3MnO.7WO_3.11H_2O$ obtained by the process of Example IX, a solution obtained by dissolving 17.2 grams of magnesium nitrate $$Mg(NO_3)_2.6H_2O$$

in about 50 cubic centimeters of water was added. After evaporating the water, the mixture was shaped and calcined at 540° C. for 4 hours.

Using 50 cubic centimeters of the catalyst so obtained, a reaction was carried out under conditions same as those of Example I.

As a result, the yield of benzonitrile was 90.2% based on the toluene supplied.

As clearly illustrated by the foregoing examples, it is possible, according to the present invention, to prepare aromatic nitriles from methyl-substituted benzenes or methyl-substituted pyridines at yields as high as 90%, with the formation of an imide byproduct of not more than a few percent at most. When comparing the results achieved in accordance with the present invention, as compared with results obtained by the use of orthoxylene as the starting material, the prior art processes would form as the principal product about 70% of imides and only about 5% of nitriles. Thus, the process of the present invention has outstanding and unobvious features over the conventional prior methods. It is apparent that the outstanding results obtained by the present invention are due to the fact that the catalytic oxide composition of this invention is highly active and highly selective as a catalyst for this reaction.

Although specific embodiments of the invention have been described herein, it is not intended to limit the invention solely thereto, but to include all changes and modifications within the spirit and scope of the appended claims.

What is claimed is:

1. A method of preparing nitriles which comprises reacting a compound selected from the group consisting of methyl-substituted benzene and methyl-substituted pyridine with ammonia and molecular oxygen in a vapor phase at a temperature in the range of 350–600° C. in the presence of manganese paratungstate.

2. A method of preparing nitriles which comprises reacting a compound selected from the group consisting of methyl-substituted benzene and methyl-substituted pyridine with ammonia and molecular oxygen in a vapor phase at a temperature in the range of 350–600° C. in the presence of manganese paratungstate and at least one promoter selected from the group consisting of oxides of aluminum, magnesium cobalt, chromium, nickel, zinc, molybdenum and tin, paratungstate of these metals, and these metal salts of aluminic acid, chromic acid, molybdic acid and stannic acid.

No references cited.

WALTER A. MODANCE, *Primary Examiner.*

ALAN D. ROTMAN, *Assistant Examiner.*